(12) United States Patent
Zimmerman et al.

(10) Patent No.: US 10,920,844 B2
(45) Date of Patent: Feb. 16, 2021

(54) VEHICLE SUSPENSION BUSHING ASSEMBLIES AND METHODS FOR MANUFACTURING SUCH BUSHING ASSEMBLIES

(71) Applicant: Hendrickson USA, L.L.C., Itasca, IL (US)

(72) Inventors: Randy J. Zimmerman, Spencerville, IN (US); Quang C. Nguyen, Willow Springs, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 153 days.

(21) Appl. No.: 15/751,434

(22) PCT Filed: Aug. 10, 2016

(86) PCT No.: PCT/US2016/046321
§ 371 (c)(1),
(2) Date: Feb. 8, 2018

(87) PCT Pub. No.: WO2017/027574
PCT Pub. Date: Feb. 16, 2017

(65) Prior Publication Data
US 2018/0231088 A1     Aug. 16, 2018

Related U.S. Application Data

(60) Provisional application No. 62/203,631, filed on Aug. 11, 2015.

(51) Int. Cl.
*F16F 1/38*     (2006.01)
(52) U.S. Cl.
CPC .......... *F16F 1/3814* (2013.01); *F16F 1/3842* (2013.01)

(58) Field of Classification Search
CPC .......... F16F 1/38; F16F 1/3814; F16F 1/3842; F16F 1/3863; F16F 1/3856; F16F 1/3873; B60G 7/02; B60G 11/12
(Continued)

(56) References Cited

U.S. PATENT DOCUMENTS

| | | | |
|---|---|---|---|
| 3,666,301 A * | 5/1972 | Jorn ........................ | F16F 1/387 403/228 |
| 7,165,909 B2 * | 1/2007 | Buhl ..................... | F16F 1/3842 403/132 |

(Continued)

FOREIGN PATENT DOCUMENTS

| | | | | |
|---|---|---|---|---|
| DE | 19638554 A1 * | 4/1997 | ................ | F16F 1/38 |
| DE | 102011013678 A1 * | 9/2012 | ............ | F16F 1/3842 |

(Continued)

OTHER PUBLICATIONS

Machine translation of DE 19638544 (no date).*

(Continued)

*Primary Examiner* — Nicholas J Lane
(74) *Attorney, Agent, or Firm* — Cook Alex Ltd.

(57) ABSTRACT

A bushing assembly for use in a vehicle suspension system includes an outer sleeve, with an elastomeric element at least partially positioned within the outer sleeve. An inner sleeve is at least partially positioned within the elastomeric element, while a bar pin having a central section is at least partially positioned within the inner sleeve. A retaining ring is positioned at or adjacent to a first end of the central section of the bar pin and at least partially within the outer sleeve. The retaining ring is positioned between the inner sleeve and at least one radially enlarged section at the first end of the central section of the bar pin and/or at least one radially inwardly directed section at a first end of the outer sleeve.

20 Claims, 11 Drawing Sheets

(58) Field of Classification Search
USPC ....... 267/141.2, 141.3, 141.4, 141.5, 140.12, 267/140.4
See application file for complete search history.

(56) References Cited

U.S. PATENT DOCUMENTS

2002/0141669 A1\* 10/2002 Testroet .................. B60G 7/02
                                                                                                        384/222
2003/0098534 A1\* 5/2003 Graeve .................. F16F 13/16
                                                                                                        267/140.11

FOREIGN PATENT DOCUMENTS

| DE | 102014013077 A1 \* | 3/2016 | ............ F16F 1/3863 |
|---|---|---|---|
| EP | 0497701 A1 | 8/1992 | |
| EP | 1691104 A1 | 8/2006 | |
| EP | 1978274 A2 | 10/2008 | |
| FR | 1439913 A \* | 5/1966 | ................ F16F 1/38 |
| LU | 41627 A1 | 10/1962 | |
| WO | WO-9747897 A1 \* | 12/1997 | ............ F16F 1/3873 |

OTHER PUBLICATIONS

Machine translation of DE 102014013077 (no date).\*
Machine translation of FR 1439913 (no date).\*
Machine translation of DE 102011013678 (no date).\*
Machine translation of WO 97/47897 (no date).\*
Notification of Transmittal of the International Search Report and the Written Opinion of the ISA for PCT/US2016/046321 dated Nov. 7, 2016 (dated Jul. 11, 2016).

\* cited by examiner

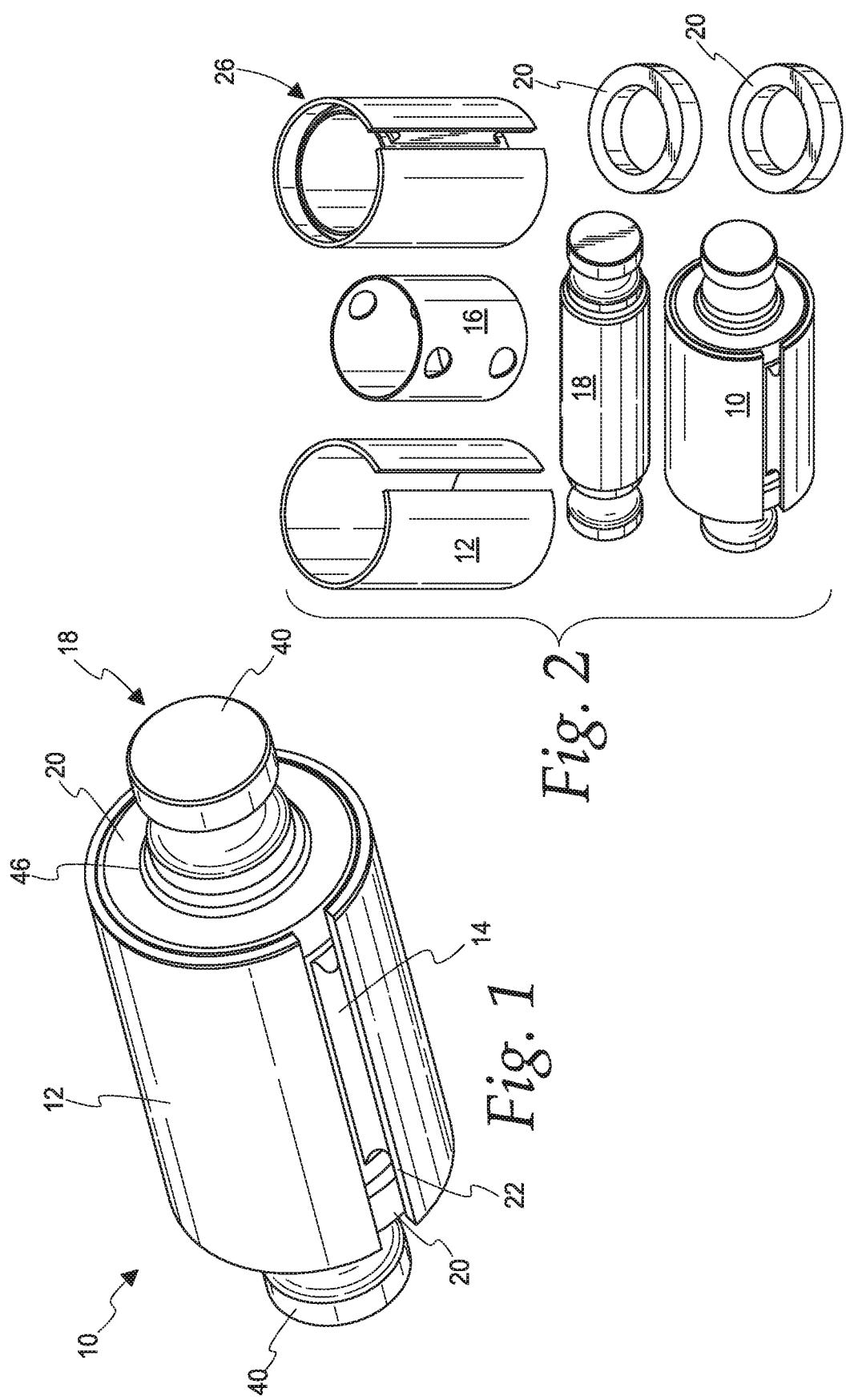

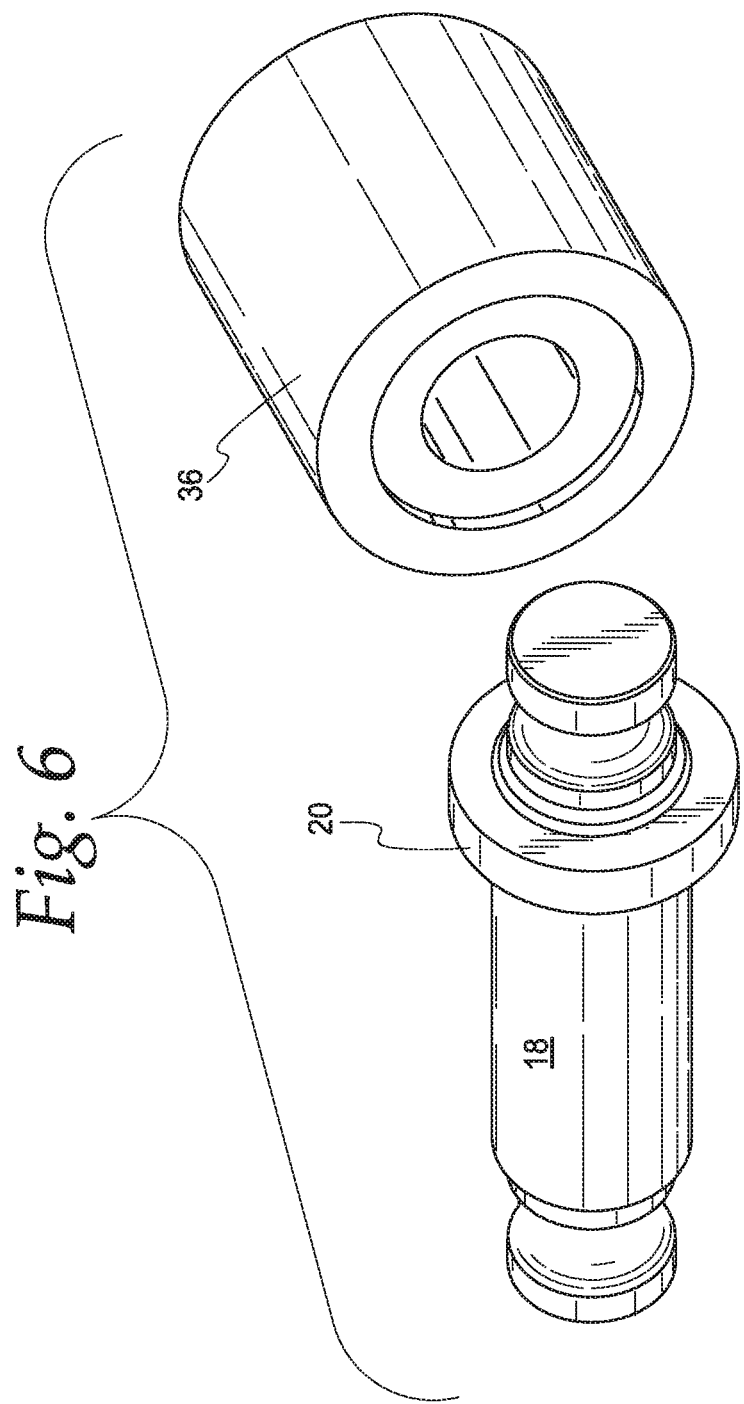

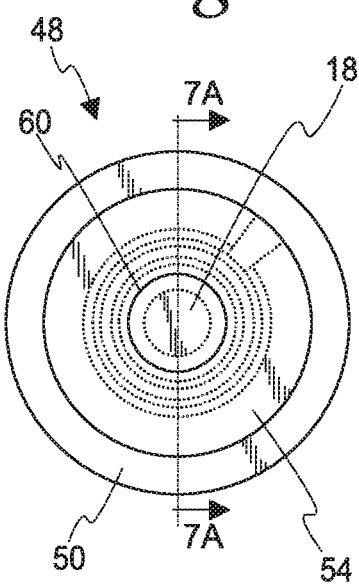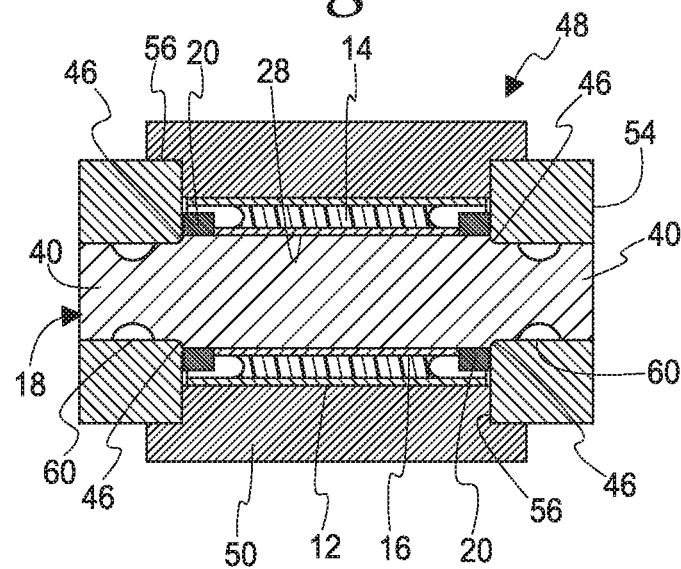

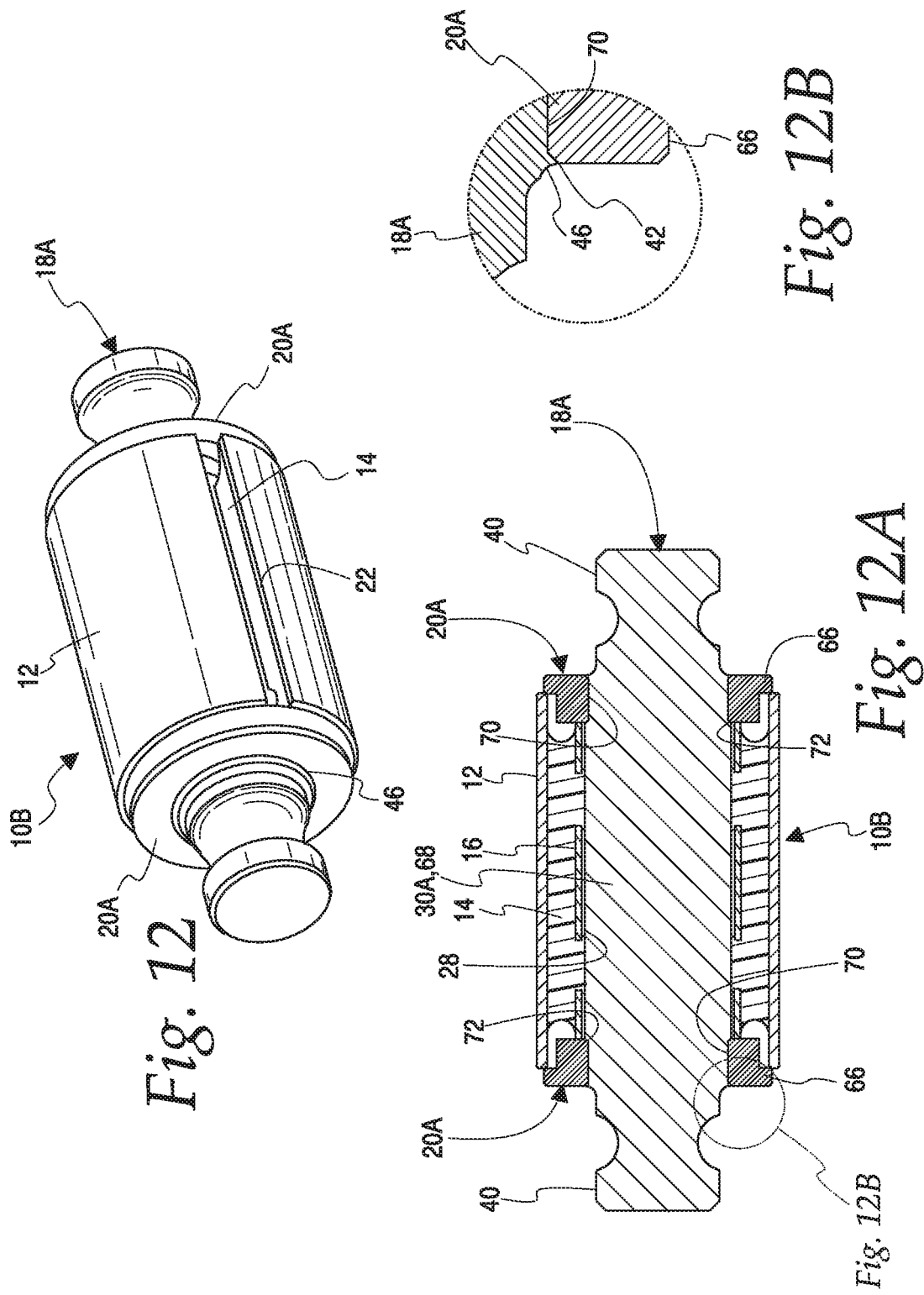

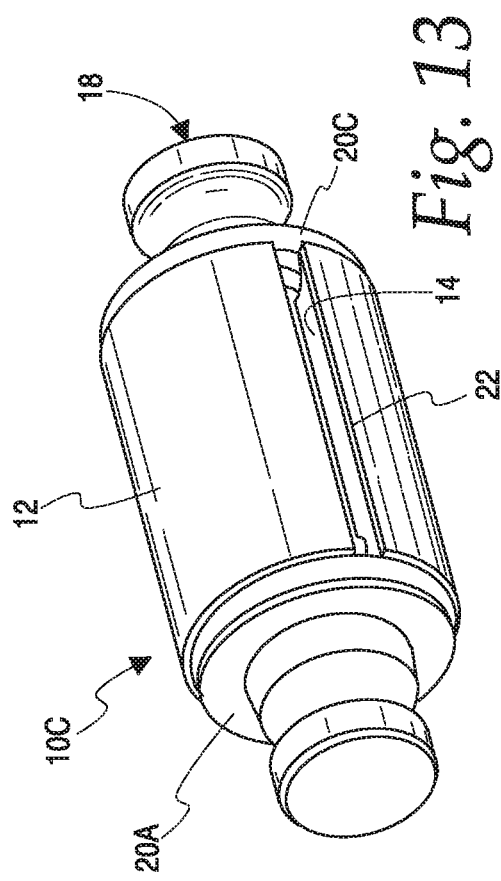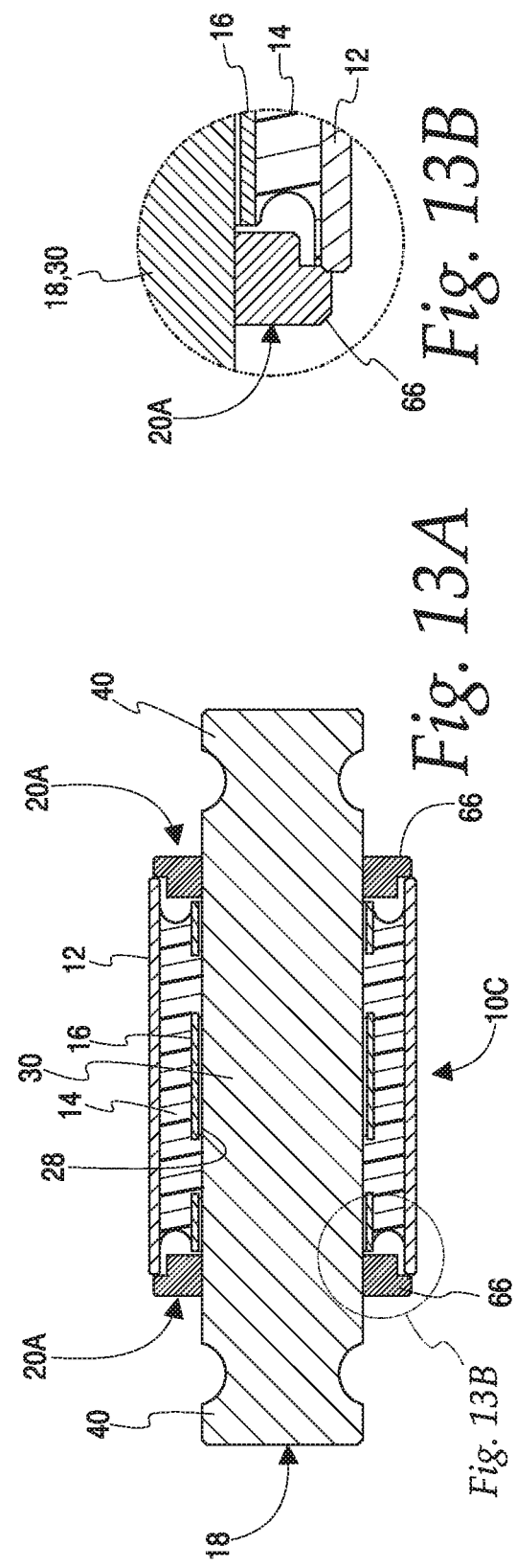

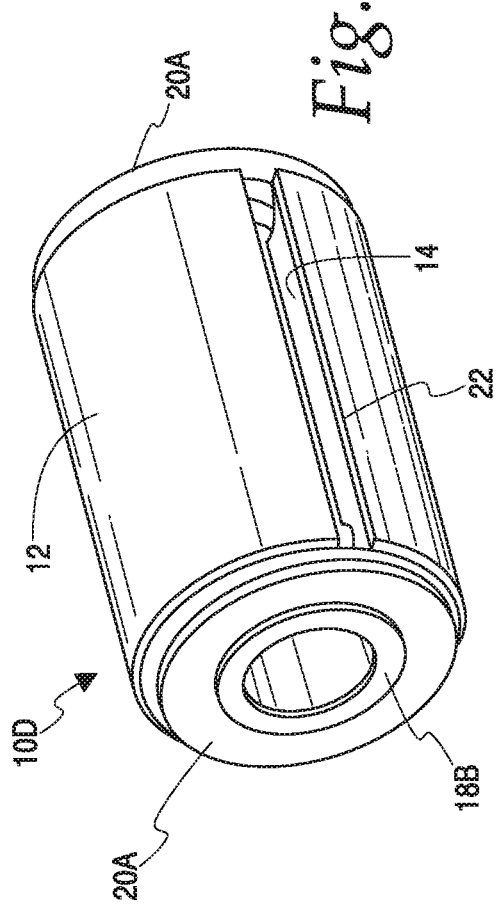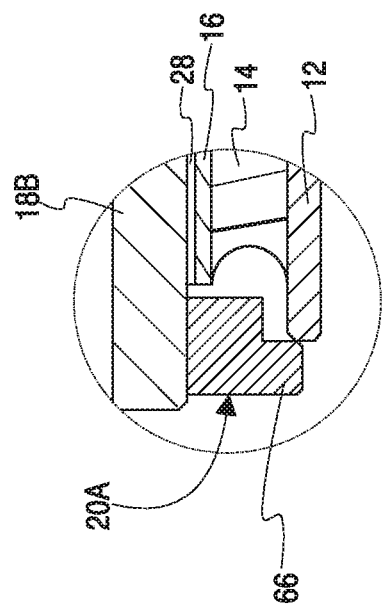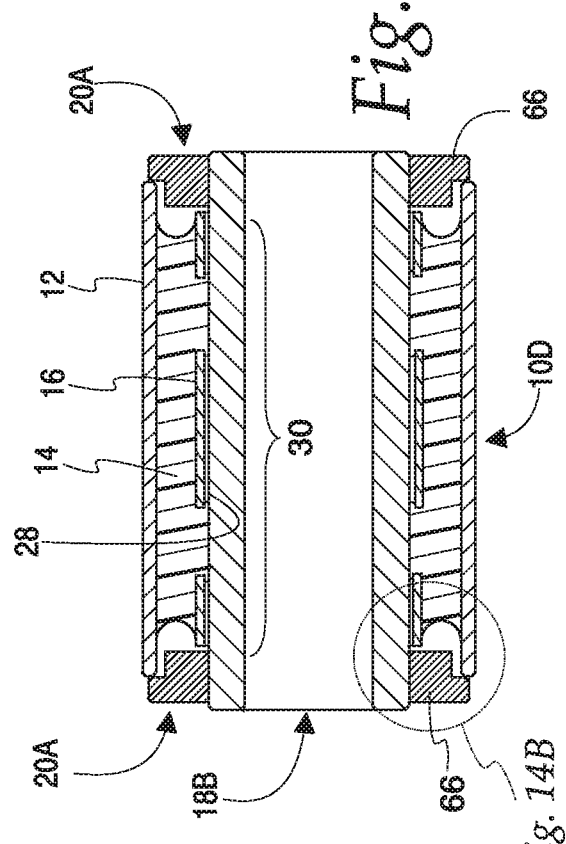

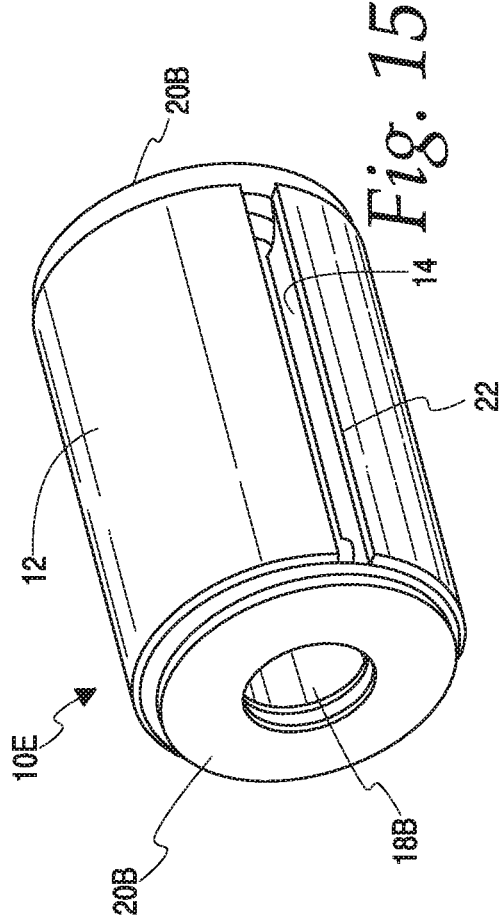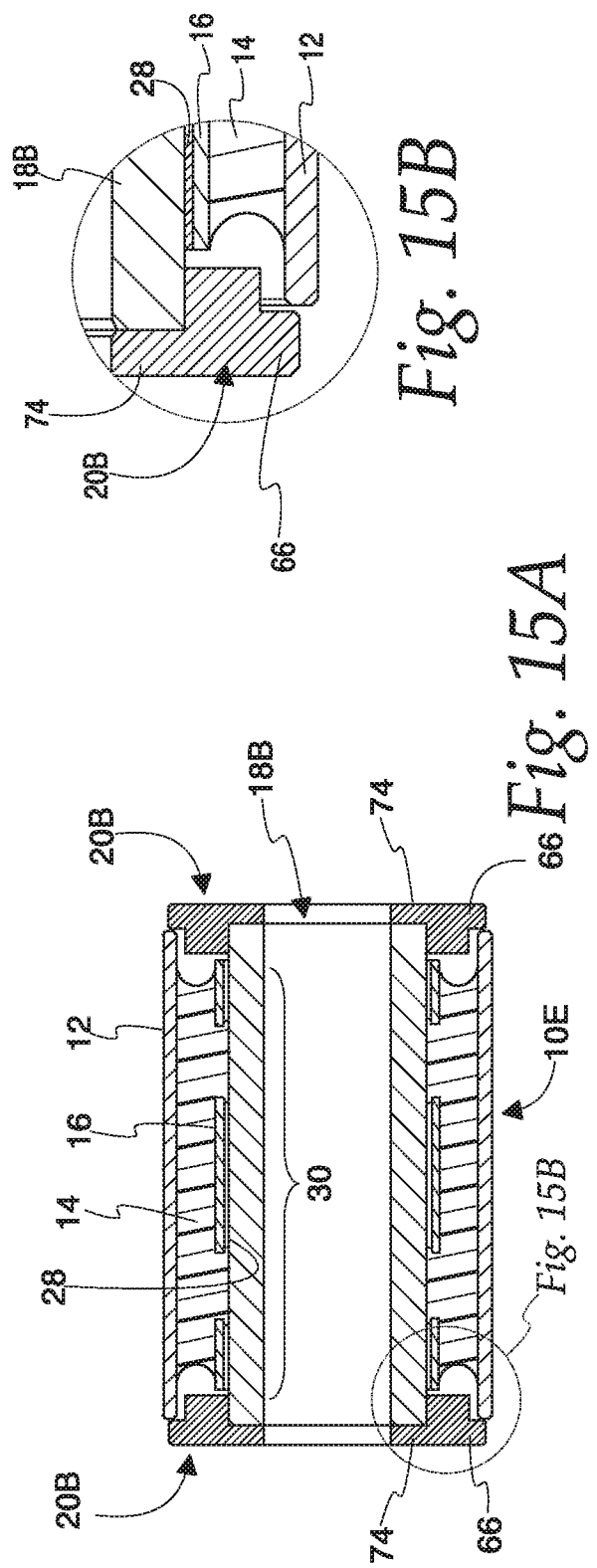

VEHICLE SUSPENSION BUSHING ASSEMBLIES AND METHODS FOR MANUFACTURING SUCH BUSHING ASSEMBLIES

RELATED APPLICATIONS

This application is a U.S. national stage application of PCT Patent Application Serial No. PCT/US2016/046321, filed Aug. 10, 2016, which claims the benefit of and priority of U.S. Provisional Patent Application Ser. No. 62/203,631, filed Aug. 11, 2015, the contents of which are incorporated by reference herein.

DESCRIPTION

Technical Field

The present subject matter relates to bushing assemblies in vehicle suspension systems. More particularly, the present subject matter relates to crimped bushing assemblies and methods of manufacturing such bushing assemblies.

BACKGROUND

The present invention is generally directed to bushing assemblies in vehicle suspension systems. More specifically, the present invention is directed to a unique construction of bushing assemblies used in vehicle suspension systems.

Vehicle suspension bushing assemblies are known. The majority of rubber bushing assemblies include just three components, namely, an outer metal component (commonly in the form of a sleeve that may be connected to a vehicle suspension component, such as an eye of a spring), an inner metal component (commonly in the form of a bar pin or tube having attachment means at both ends that may be connected to a vehicle structure, such as a shackle or bracket), and an elastomeric element that is located between the outer and inner metal components. The components are typically held together via high precompression in the rubber, mold bonding with adhesive, or a combination of both.

The bar pin commonly is contained within a combination of a tubular metal sleeve attached to an elastomeric element made of rubber or the like. The tubular metal sleeve and the bar pin may need to be machined to very exact tolerances to properly fit together. The increased machining and processing of the components to meet strict tolerances tends to increase costs. Such bushings tend to be relatively stiff in the radial and conical directions, while being relatively compliant in the axial and torsional directions.

Some prior art bushings include only an inner metal component and an elastomeric element, wherein the elastomeric element cooperates directly with a vehicle suspension component, such as an eye of a spring. The bar pin of such bushings may have attachment means at both ends to allow the bushing assembly to be attached to a vehicle structure. Such bushings tend to be less durable and more compliant.

Still other bushing designs tend to have inner and outer metal components that require exact tolerances for assembly. The requirement for tight tolerances may be diminished by the use of a retaining ring or comparable means for securing the bar pin and sleeve. Typically, a retaining ring is associated with the other components of the bushing assembly by a press fit. While this may be sufficient to initially fasten a retaining ring in place, high axial loads may shift the retaining ring, which could render the retaining ring ineffective.

U.S. Pat. No. 6,430,774, which is hereby incorporated herein by reference, describes one known approach to the problem of a shifting retaining ring. In particular, the tubular sleeve is replaced with a cup-shaped member having an open end and an opposite end with an inwardly curved portion. The inwardly curved portion bears against an axial end of the elastomeric element, while the open end of the cup-shaped member allows a retaining ring to be placed against the opposite axial end of the elastomeric element. After the retaining ring has been put into place, the open end of the cup-shaped member is crimped or otherwise deformed to press the retaining ring against the elastomeric element, thereby preventing the retaining ring from shifting in high-load conditions.

While the bushing assembly described in U.S. Pat. No. 6,430,774 may be better suited to prevent a retaining ring from shifting during use, there remains the need for improved bushing assemblies and methods for manufacturing such bushing assemblies, and some bushing applications may require different performance characteristics that may not be achievable with typical bushing assembly designs.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a vehicle suspension bushing assembly includes an outer sleeve, an elastomeric element, an inner sleeve, a retaining ring, and a bar pin. The elastomeric element and the retaining ring are at least partially positioned within the outer sleeve, while the inner sleeve is at least partially positioned within the elastomeric element and the bar pin is at least partially positioned within the inner sleeve and retaining ring. The bar pin has a central section extending between first and second ends. The first end of the central section includes at least one radially enlarged section of the bar pin and/or a first end of the outer sleeve includes at least one radially inwardly directed section. The retaining ring is positioned between the inner sleeve and the at least one radially enlarged section of the bar pin or the at least one radially inwardly directed section of the outer sleeve.

In another aspect, a method is provided for assembling a vehicle suspension bushing assembly. The method includes providing an outer sleeve having an elastomeric element at least partially positioned within the outer sleeve and an inner sleeve at least partially positioned within the elastomeric element. The method further includes positioning at least a portion of a bar pin within the inner sleeve and positioning a retaining ring at or adjacent to a first end of a central section of the bar pin and at least partially within the outer sleeve. The method also includes defining at least one radially enlarged section at the first end of the central section of the bar pin and/or at least one radially inwardly directed section on the outer sleeve, wherein the retaining ring is positioned between the inner sleeve and the at least one radially enlarged section of the bar pin or the at least one radially inwardly directed section of the outer sleeve.

In yet another aspect, a vehicle suspension bushing assembly includes a bar pin. The vehicle suspension bushing assembly also includes an outer sleeve and an elastomeric element at least partially positioned within the outer sleeve. An inner sleeve surrounds the bar pin and is at least partially positioned within the elastomeric element. A retaining ring or ferrule is at least partially positioned within the outer sleeve and includes an outwardly extending flange positioned outside of the outer sleeve.

The bushing assembly of the present disclosure seeks performance that is different from typical bushing assembly designs. Indeed, the present disclosure seeks to provide a bushing assembly that is very stiff in the radial, conical and axial directions, but relatively compliant in the torsional direction. In other words, the desired performance is somewhat like a metal bearing assembly, but without the service or costs associated with manufacturing a metal bearing assembly. The features of the bushing assembly disclosed herein that provide the high radial, conical, and axial stiffness include: (1) having a high rubber modus for the elastomeric element, (2) having high precompression in the elastomeric element once assembled into a vehicle suspension component, such as an eye of a spring, which is facilitated by the slit in the outer sleeve, and (3) the conical snubbers that also are referred to herein as retaining rings. Unfortunately, several of these items tend to boost torsional stiffness and reduce torsional angular capacity. However, the high torsional angles can be addressed in the present bushing assemblies by use of an elastomeric liner to provide a slip feature. In one example embodiment, a thin elastomeric liner is located between an in-mold bonding intermediate metal component, in the form of the inner sleeve, and a pressed-in bar pin. The thin elastomeric liner provides a large amount of grip between the metal components, so the bushing does not move axially or rotate easily. However, the interface ultimately will slip under high torsional moments, thus providing greatly increased durability for the bushing assembly.

BRIEF DESCRIPTION OF THE DRAWINGS

In the following detailed description, reference will frequently be made to the following drawings, in which like reference numerals refer to like components, and in which:

FIG. 1 is a front perspective view of a vehicle suspension bushing assembly according to an aspect of the present disclosure;

FIG. 2 shows individual components of the vehicle suspension bushing assembly of FIG. 1, along with a front elevational view of the assembled vehicle suspension bushing assembly;

FIG. 6 is a front perspective view of a retaining ring and bar pin of the vehicle suspension bushing assembly and a component of the assembly tool for advancing the retaining ring onto the bar pin;

FIG. 7 is a side elevational view of the vehicle suspension bushing assembly of FIG. 1, positioned within a crimping tool;

FIG. 7A is a cross-sectional view of the crimping tool and vehicle suspension bushing assembly of FIG. 7, taken through the line 7A-7A of FIG. 7;

FIG. 7B is a detail view of portions of the crimping tool and vehicle suspension bushing assembly of FIG. 7;

FIG. 12 is a front perspective view of another embodiment of a vehicle suspension bushing assembly according to an aspect of the present disclosure;

FIG. 12A is a cross-sectional view of the vehicle suspension bushing assembly of FIG. 12;

FIG. 12B is a detail view of a portion of the vehicle suspension bushing assembly of FIG. 12;

FIG. 13 is a front perspective view of another embodiment of a vehicle suspension bushing assembly according to an aspect of the present disclosure;

FIG. 13A is a cross-sectional view of the vehicle suspension bushing assembly of FIG. 13;

FIG. 13B is a detail view of a portion of the vehicle suspension bushing assembly of FIG. 13;

FIG. 14 is a front perspective view of another embodiment of a vehicle suspension bushing assembly according to an aspect of the present disclosure;

FIG. 14A is a cross-sectional view of the vehicle suspension bushing assembly of FIG. 14;

FIG. 14B is a detail view of a portion of the vehicle suspension bushing assembly of FIG. 14;

FIG. 15 is a front perspective view of another embodiment of a vehicle suspension bushing assembly according to an aspect of the present disclosure;

FIG. 15A is a cross-sectional view of the vehicle suspension bushing assembly of FIG. 15; and FIG. 15B is a detail view of a portion of the vehicle suspension bushing assembly of FIG. 15.

DETAILED DESCRIPTION OF THE ILLUSTRATED EMBODIMENTS

Figure 3A:
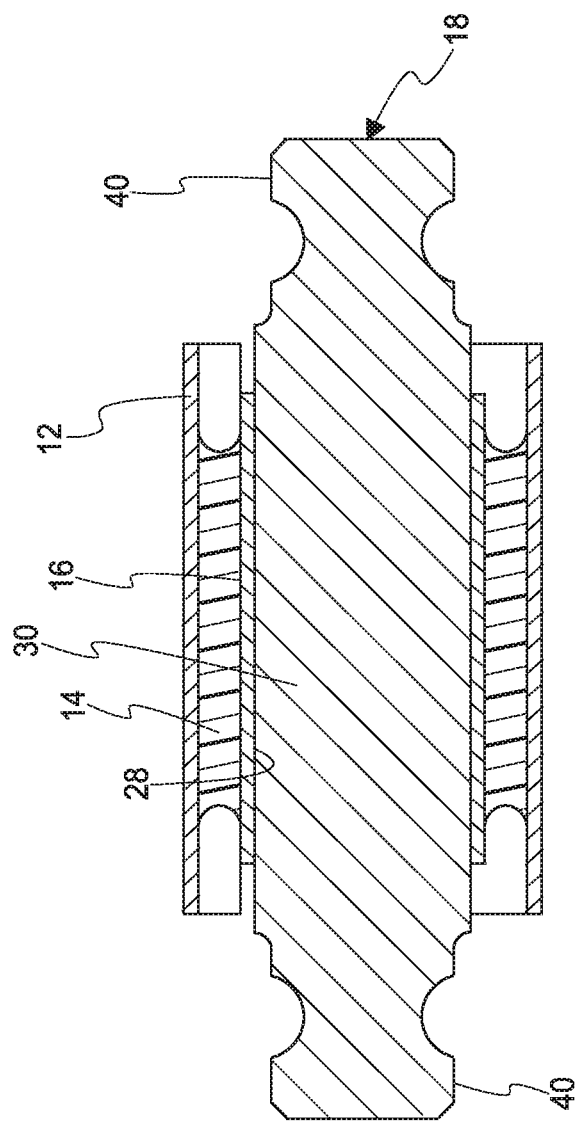
FIG. 3A is a cross-sectional view of the components of the vehicle suspension bushing assembly of FIG. 3, taken through the line 3A-3A of FIG. 3.

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

FIG. 1 illustrates a bushing assembly 10 for use in a vehicle suspension. FIG. 2 shows individual components of the bushing assembly 10, along with another view of the bushing assembly 10 in an assembled condition. The bushing assembly 10 includes an outer sleeve or slit outer metal 12, an elastomeric element or elastomeric layer 14, an inner sleeve or intermediate metal 16, a bar pin 18, and at least one conical snubber that will be referred to herein as a retaining ring 20. In the illustrated embodiment, the bushing assembly 10 includes a pair of retaining rings, which may be advantageous for reasons described herein.

The bushing assembly 10 may be configured to connect a leaf spring of the vehicle suspension, such as through an eye at an end of the spring, and to a portion of the vehicle frame, such as by connection to a shackle or bracket. However, it also is within the scope of the present disclosure for the bushing assembly to be configured to connect a leaf spring to another component of the vehicle suspension or to connect two other components of a vehicle suspension. Typically, a single vehicle suspension will include a plurality of bushing assemblies to connect various components of the vehicle suspension, with the various bushing assemblies being either substantially identical or differently configured (including being differently sized, having different components, and/or having components formed of different materials).

The outer sleeve 12 may be variously configured without departing from the scope of the present disclosure. The illustrated outer sleeve 12 is generally tubular, but with a slit 22 that prevents the outer sleeve 12 from defining a complete tube having a continuous side wall. It may be advantageous for the outer sleeve 12 to be substantially tubular, with the outer sleeve 12 extending over a greater arc than the slit 22. For example, in one embodiment shown in FIG. 3A, the outer sleeve 12 defines a 345° arc, with the slit 22 defining a 15° opening, but it is also within the scope of the present disclosure for the outer sleeve 12 and slit 22 to define different percentages of a 360° arc. It may be advantageous for the outer sleeve 12 to be formed of a deformable material, such that the outer sleeve 12 may be deformed to increase or decrease the size of the slit 22 prior to and/or during installation. In one embodiment, the outer sleeve 12 is formed of a thin metallic material (e.g., steel) that is ductile or otherwise capable of being flexed or deformed, but it is also within the scope of the present disclosure for the outer sleeve 12 to be formed of any other suitable material or materials.

The elastomeric element 14 is at least partially positioned within the outer sleeve 12. The elastomeric element 14 may be fixedly secured or bonded to the inner surface of the outer sleeve 12 (e.g., by an adhesive, in-mold bonding or any other suitable approach) or may be non-fixedly associated with the outer sleeve 12 or inner sleeve 16. In the illustrated embodiment, the elastomeric element 14 is fully received within the outer sleeve 12, with opposing ends of the elastomeric element 14 being spaced inwardly of the ends of the outer sleeve 12, as shown in FIG. 3A. Such a configuration allows for the elastomeric element 14, when compressed, to bulge axially outwardly, with the ends of the elastomeric element 14 approaching the ends of the outer sleeve 12. In other embodiments, one or both of the ends of the elastomeric element 14 may be closer to or farther from the associated end of the outer sleeve 12 than what is illustrated, along with one or both of the ends of the elastomeric element 14 being differently configured than the illustrated concave configuration.

Figure 3:
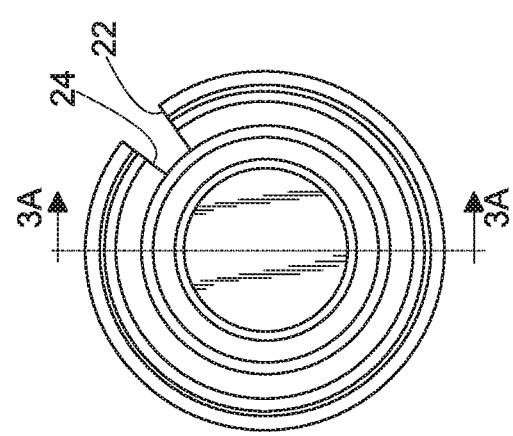
FIG. 3 is a side elevational view of selected components of the vehicle suspension bushing assembly of FIG. 1.

The elastomeric element 14 may be variously configured without departing from the scope of the present disclosure. Similar to the outer sleeve 12, the illustrated elastomeric element 14 is generally tubular, but with a slit 24 (FIG. 3) that prevents the elastomeric element 14 from defining a complete tube having a continuous side wall. It may be advantageous for the elastomeric element 14 to be substantially tubular, with the elastomeric element 14 extending over a greater arc than the slit 24. For example, in one embodiment shown in FIG. 3A, the elastomeric element 14 defines a 345° arc, with the slit 24 defining a 15° opening, but it is also within the scope of the present disclosure for the elastomeric element 14 and slit 24 to define different percentages of a 360° arc. If the outer sleeve 12 and the elastomeric element 14 are both provided with slits 22, 24, it may be advantageous for the slits 22 and 24 to be similarly sized and substantially aligned (as shown in FIG. 3). In other embodiments in which the outer sleeve 12 and the elastomeric element 14 both include slits 22, 24, the slits 22 and 24 may be differently sized and/or the slits 22 and 24 may be at least partially misaligned. It is also within the scope of the present disclosure for the elastomeric element 14 to define a complete tube, which may be advantageous if the outer sleeve 12 also defines a complete tube. However, it should be understood that either one of the outer sleeve 12 and the elastomeric element 14 may include a slit 22, 24, while the other does not.

In one embodiment, the elastomeric element 14 is formed of a rubber material, but it is also within the scope of the present disclosure for the elastomeric element 14 to be formed of any other suitable elastomer or comparable material. The elastomeric element 14 is shown as having a greater thickness than the outer sleeve 12 (e.g., a thickness that may be at least twice that of the outer sleeve 12), but it is also within the scope of the present disclosure for the elastomeric element 14 to have the same thickness as the outer sleeve 12 or for the elastomeric element 14 to have a lesser thickness than the outer sleeve 12.

In the illustrated embodiment, the inner sleeve 16 is at least partially positioned within the elastomeric element 14 (FIG. 3A). The combination of the outer sleeve 12, elastomeric element 14, and inner sleeve 16 may be collectively referred to as a molded bushing 26 (FIG. 2), although it should be understood that the integration of these three components may be achieved by a molding procedure, but is not restricted to a particular procedure.

The outer surface of the inner sleeve 16 may be fixedly secured or bonded to the inner surface of the elastomeric element 14 (e.g., by an adhesive, in-mold bonding or any other suitable approach) or may be non-fixedly associated with the elastomeric element 14. In the illustrated embodiment, the inner sleeve 16 defines a plurality of openings or apertures and is more elongated than the elastomeric element 14, such that the ends of the inner sleeve 16 are positioned outside or beyond the ends of the elastomeric element 14, as shown in FIG. 3A. In other embodiments, one or both of the ends of the inner sleeve 16 may be closer to or farther from the associated end of the elastomeric element 14 than what is illustrated, including at least one of the ends of inner sleeve 16 being positioned inwardly of the associated end of the elastomeric element 14. However, it may be advantageous for the inner sleeve 16 to be at least as elongated as the elastomeric element 14 to provide more surface area to contact the outer surface of the bar pin 18 directly, or for an elastomeric liner 28 (FIG. 3A) that may be located between the inner sleeve 16 and the bar pin 18 to have a greater area of interaction, as well as for the inner sleeve 16 to interact with the retaining rings 20, as will be described herein.

The inner sleeve 16 may be variously configured without departing from the scope of the present disclosure. The inner sleeve 16 may include a slit, similar to the illustrated outer sleeve 12 and elastomeric element 14 or it may be substantially tubular, as in the illustrated embodiment, as seen in FIGS. 2 and 3A. It may be advantageous for the inner sleeve 16 to be tubular, rather than having a slit or opening, to provide more surface area to contact the outer surface of the bar pin 18 or to provide a continuous surface for an elastomeric liner 28.

In one embodiment, the inner sleeve 16 is formed of a metallic material, such as steel, but it is also within the scope of the present disclosure for the inner sleeve 16 to be formed of any other suitable material or combination of materials. The outer and inner sleeves 12 and 16 may be formed of the same materials or different materials. The inner sleeve 16 is shown as having a lesser thickness than the outer sleeve 12 (e.g., a thickness that is approximately half that of the outer sleeve 12), but it is also contemplated within the scope of the present disclosure for the inner sleeve 16 to have the same thickness as the outer sleeve 12 or for the inner sleeve 16 to have a greater thickness than the outer sleeve 12.

At least a portion of the bar pin 18 is positioned within the inner sleeve 16, as shown in FIGS. 3 and 3A. In the illustrated embodiment, the inner diameter of the inner sleeve 16 is slightly larger than the outer diameter of a central section 30 of the bar pin 18, with a thin elastomeric liner 28 therebetween, such that the bar pin 18 must be pressed into the open interior of the inner sleeve 16. This results in a friction fit and a resistance to axial and torsional motion of the outer surface of central section 30 of the bar pin 18 relative to the inner surface of the inner sleeve 16. It also is possible to not include an elastomeric liner 28, in which case the metal of the inner sleeve 16 will directly contact the bar pin 18. It will be appreciated that the elastomeric liner 28 may be applied or otherwise connected to the bar pin 18 or may be applied or otherwise connected to the inner surface of the inner sleeve 16 prior to assembly with the inner sleeve 16. The elastomeric liner 28 also may be advantageously formed on the inner surface of the inner sleeve 16 when combining the inner sleeve 16 and outer sleeve 12 and forming the elastomeric element 14 between the sleeves 12 and 16.

In one embodiment, the inner diameter of the inner sleeve 16 is nominally smaller than the outer diameter of the central section 30 of the bar pin 18, in which case it may be advantageous for the inner sleeve 16 to be ductile or otherwise deformable to allow the central section 30 of the bar pin 18 to be positioned within the inner sleeve 16. If provided, the slits 22 and 24 also allow for the outer sleeve 12 and elastomeric element 14 to be outwardly deformed to accommodate a bar pin 18 with a central section 30 having a relatively large diameter. Alternatively, if the central section 30 of the bar pin 18 has a small diameter, then the slits 22 and 24 may be at least partially closed for a closer fit against the outer surface of the central section 30 of the bar pin 18.

Figure 4:
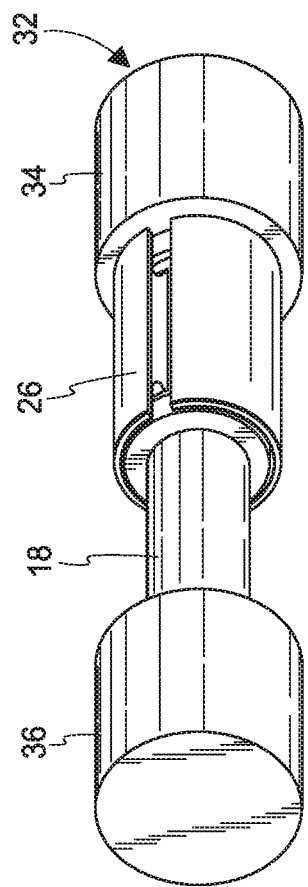
FIG. 4 is a front elevational view of the components of FIGS. 3 and 3A being assembled using an assembly tool.
Figure 5A:
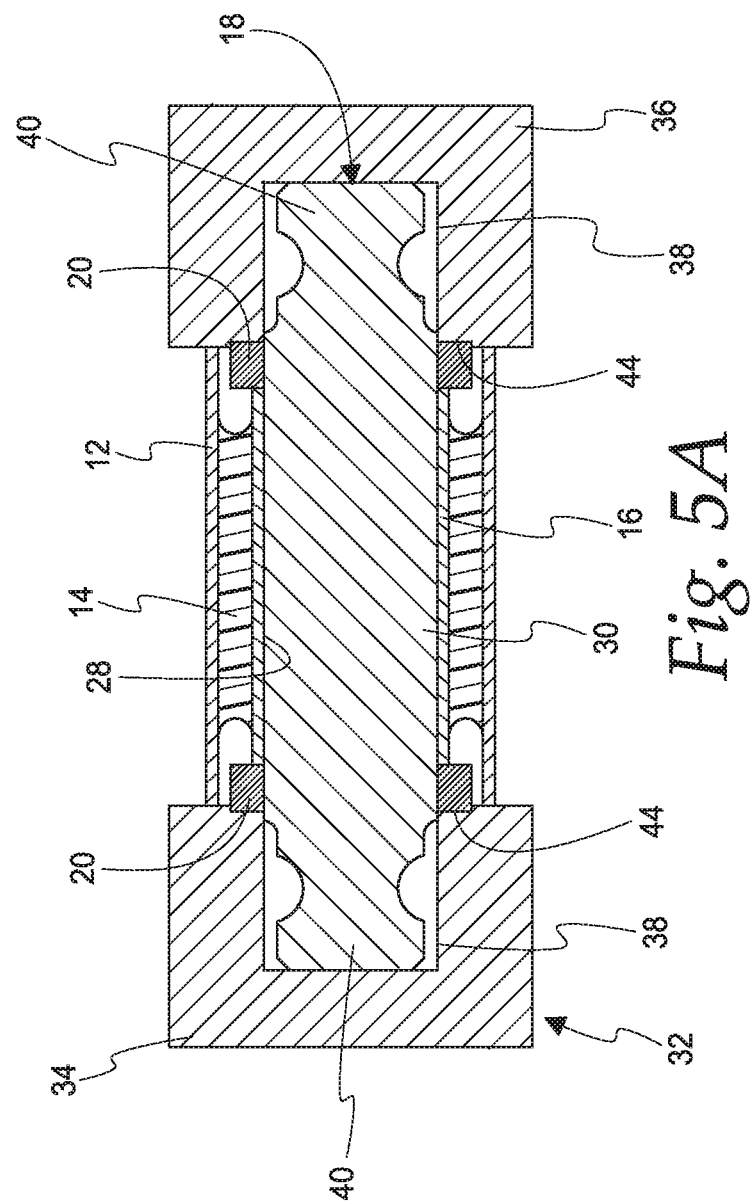
FIG. 5A is a cross-sectional view of the assembly tool and the components of the vehicle suspension bushing assembly of FIG. 5, taken through the line 5A-5A of FIG. 5.
Figure 5:
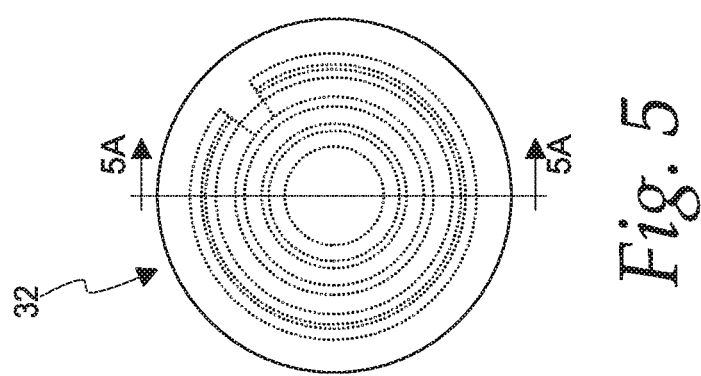
FIG. 5 is a side elevational view of the components of the vehicle suspension bushing assembly of FIGS. 3 and 3A, with retaining rings being advanced into position by the assembly tool of FIG. 4.
Figure 8:
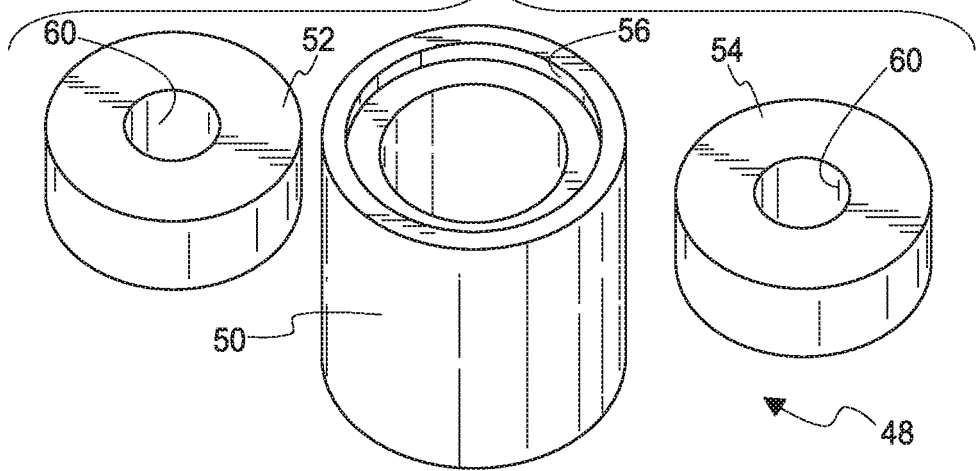
FIG. 8 is a perspective view of selected components of the crimping tool of FIGS. 7 and 7A.

The bar pin 18 may be advanced into the open interior of the molded bushing 26 according to any suitable approach and using any suitable tool without departing from the scope of the present disclosure. FIGS. 4-5A show an exemplary assembly tool 32 that may be used to advance the bar pin 18 into the molded bushing 26. The illustrated assembly tool 32 comprises a base 34 and a pusher 36. The base 34 and pusher 36 may be substantially identical, with each being substantially cylindrical and having a coaxial, substantially annular or cylindrical cavity or recess 38 extending partially inward from an end, providing them with a generally "cup-like" shape (FIGS. 5A and 6). The base 34 and pusher 36 are arranged so that their cavities 38 are aligned and facing each other, with one cavity 38 (illustrated in FIG. 4 as the cavity 38 of the pusher 36) at least partially receiving an end portion of the bar pin 18. The cavity 38 of the other component (illustrated in FIG. 4 as the cavity 38 of the base 34) supports the molded bushing 26 in coaxial relationship with the bar pin 18. The component configured to support the molded bushing 26 may include an annular groove or counter-bore or recess that receives an end of the molded bushing 26 to hold the molded bushing 26 in position. It is also within the scope of the present disclosure for different retention means to be provided for retaining the molded bushing 26 in position during assembly.

One or both of the pusher 36 and the base 34 are associated with a press (not illustrated) that forcibly advances the pusher 36 and base 34 toward each other. The press may be variously configured (e.g., as a hydraulic press) without departing from the scope of the present disclosure. By operating the press with the bar pin 18 and molded bushing 26 positioned as in FIG. 4 between the pusher 36 and the base 34, the bar pin 18 will be pressed into the open interior of the molded bushing 26, thereby creating a press-fit between the outer surface of the bar pin 18 and the inner surface of the inner sleeve 16, potentially with the inner sleeve 16 or bar pin 18 bearing an elastomeric liner 28. In a preferred embodiment, the press of the assembly tool 32 is operated until the base 34 and the pusher 36 are in contact with the two ends of the outer sleeve 12, with the molded bushing 26 being centered upon the central section 30 of the bar pin 18 at that time.

The bar pin 18 may be variously configured without departing from the scope of the present disclosure. For example, the central section 30 of the bar pin 18 may be configured according to any of the embodiments described and illustrated in U.S. Pat. No. 8,192,106 (e.g., with a cruciform shape), which is hereby incorporated herein by reference. In the illustrated embodiment, the bar pin 18 is generally cylindrical, with the central section 30 being substantially cylindrical and with end portions 40 that are positioned outside of the outer and inner sleeves 12 and 16 and the elastomeric element 14. The end portions 40 are configured to allow the bushing assembly 10 to be connected to a component of the vehicle suspension, so they may be differently configured, depending on the component to which they are to be secured and the way in which they are to be secured to that component. The bar pin 18 may be formed of a metallic material, such as steel, or any other suitable material, and may be of solid or tubular construction.

One or more generally annular or tubular retaining rings or conical snubbers 20 may be employed to limit the degree of conical angle and radial strain on the bushing assembly 10. The conical snubbers will be referred to hereinafter as retaining rings and may further serve to ensure that the bar pin 18 does not move or shift axially with respect to the molded bushing 26 and generally to prevent damage to the elastomeric element 14. In the illustrated embodiment, a pair of retaining rings 20 (which may be formed of a metallic material) is provided, but it is also within the scope of the present disclosure for a single retaining ring 20 to be employed or for more than two retaining rings 20 to be employed. In bushing assemblies 10 of the type having two retaining rings 20 (as in the illustrated embodiment), the retaining rings 20 may be positioned on opposite ends of the inner sleeve 16 and may resist a tendency of the compressed elastomeric element 14 to expand axially outward from the ends of the outer and inner sleeves 12 and 16. Regardless of the number of retaining rings 20 employed, it may be advantageous for each retaining ring 20 to be at least partially positioned within the outer sleeve 12, with the central section 30 of the bar pin 18 being received within the retaining ring 20. By such a configuration, the retaining rings 20 prevent excess inward radial movement of the ends of the outer sleeve 12 which, if not prevented, could overload and damage the elastomeric element 14. It will be appreciated that the retaining ring or conical snubber 20 could have a shape other than a simple generally cylindrical ring. For example, the retaining ring 20 could have a stepped cylindrical configuration, wherein a smaller diameter portion may be positioned within the outer sleeve 12, while a larger diameter portion having a diameter similar to the outer diameter of the outer sleeve 12 may be located adjacent an end of the outer sleeve 12. Such a configuration could not only limit strains/travel in the radial and conical directions, but also could limit strains/travel in the axial direction.

Preferably, the retaining ring or rings 20 are configured to have an inner diameter that forms a friction fit with the central section 30 of the associated bar pin 18, but may otherwise be variously configured without departing from the scope of the present disclosure. For example, in the illustrated embodiment, the retaining rings 20 are substantially annular and are substantially identical to each other, but in other embodiments, a retaining ring 20 may be non-annular and, if multiple retaining rings 20 are employed, two or more of the retaining rings 20 may be differently configured. One or (more preferably both) of the ends of the retaining rings 20 may include chamfers at their inner and outer perimeters, such as the outer perimeter chamfer 42 shown in FIG. 7B. The chamfers may assist in advancing the retaining rings 20 onto the bar pin 18 and/or provide a retention feature, as will be described in greater detail herein.

Depending on the configuration and nature of the retaining rings 20 and other components of the bushing assembly 10, the way in which the retaining rings 20 are associated with the bar pin 18 may vary. In an exemplary embodiment, which is illustrated in FIGS. 5-6, the same assembly tool 32 of FIG. 4 is employed to advance the retaining rings 20 into position on the bar pin 18. FIG. 6 shows a retaining ring 20 loosely positioned about an end portion 40 of the bar pin 18 in anticipation of being advanced onto the central section 30 of the bar pin 18. Preferably, the molded bushing 26 is already positioned on the central section 30 of the bar pin 18 when the retaining rings 20 are advanced onto the bar pin 18, so it should be understood that the molded bushing 26 is only omitted from FIG. 6 for illustrative purposes.

If the assembly tool 32 of FIGS. 4-5A is employed, a retaining ring 20 is loosely placed onto each end portion 40 of the bar pin 18, as shown at one end in FIG. 6 for one of the retaining rings 20. The base 34 and pusher 36 of the assembly tool 32 are arranged so that their cavities 38 are aligned and facing each other, with each cavity 38 at least partially receiving an end portion 40 of the bar pin 18. As shown in FIG. 5A, the facing surfaces of the base 34 and the pusher 36 may include an annular groove or counter-bore or recess 44 that receives the outer end of the associated retaining ring 20 to hold the retaining rings 20 in position. It is also within the scope of the present disclosure for different retention means to be provided for aligning the retaining rings 20 during assembly.

By operating the press with the bar pin 18 and retaining rings 20 so positioned, the retaining rings 20 will be pressed onto the outer surface of the central section 30 of the bar pin 18 until they abut the opposing ends of the inner sleeve 16 (FIG. 5A). As described above, the inwardly facing ends of the retaining rings 20 may include a chamfer at their inner perimeter to help guide the retaining rings 20 onto the central section 30 of the bar pin 18.

With the retaining rings 20 pressed onto the bar pin 18 and in contact with or directly adjacent to the ends of the inner sleeve 16, one or both of the ends of the central section 30 of the bar pin 18 may be manipulated to fasten the retaining rings 20 in place (FIGS. 7-7B). It should be understood that, if the bushing assembly 10 is provided with only one retaining ring 20, then it is within the scope of the present disclosure for only the associated end of the central section 30 of the bar pin 18 to be manipulated to fasten the single retaining ring 20 in place, without manipulating the other end of the central section 30 of the bar pin 18. If both ends of the central section 30 of the bar pin 18 are manipulated, it is within the scope of the present disclosure for them to be similarly or differently manipulated and/or for the post-manipulation configurations of the ends of the central section 30 to be similar or different.

One or both ends of the central section 30 of the bar pin 18 may be manipulated to provide at least one radially enlarged section 46 at that end (FIG. 7B). Preferably, each radially enlarged section 46 has an outer radius that is larger than the inner radius of the associated retaining ring 20 and is positioned outwardly of the associated retaining ring 20 (i.e., farther from the elastomeric element 14). By such a configuration, the retaining ring 20 is positioned between the inner sleeve 16 and the radially enlarged section 46, such that the radially enlarged section 46 prevents the associated retaining ring 20 from shifting away from the inner sleeve 16 and escaping the molded bushing 26.

Preferably, each radially enlarged section 46 pins or otherwise maintains the associated retaining ring 20 in contact with another component of the bushing assembly 10. For example, in the illustrated embodiment (FIGS. 7-7B), each radially enlarged section 46 abuts the outer end of the associated retaining ring 20, while an end of the inner sleeve 16 abuts the inner end of that retaining ring 20. By such a configuration, each retaining ring 20 is held in place between the inner sleeve 16 and the associated radially enlarged section 46.

If both ends of the central section 30 of the bar pin 18 include radially enlarged sections 46 for retaining rings 20 positioned on opposite sides of the elastomeric element 14 (as in FIG. 7A), then the radially enlarged sections 46 may cooperate to effectively lock the retaining rings 20 in place on the bar pin 18, thereby preventing the retaining rings 20 from moving or shifting with respect to the bar pin 18. In particular, the radially enlarged sections 46 at the opposing ends of the central section 30 of the bar pin 18 may abut the outer ends of the associated retaining rings 20, with the inner ends of the retaining rings 20 abutting the ends of the inner sleeve 16 or axially compressing the elastomeric element 14, thereby blocking the retaining rings 20 from sliding off of the ends of the central section 30 of the bar pin 18.

The exact number and configuration of the radially enlarged sections 46 may vary without departing from the scope of the present disclosure. In one embodiment, a radially enlarged section 46 may comprise a single complete ring around the perimeter of the central section 30 of the bar pin 18. In another embodiment, the radially enlarged section 46 may comprise a single raised extension or projection or formation on the bar pin 18 that extends along less than the entire perimeter of the central section 30. In another embodiment, the radially enlarged section 46 may comprise a plurality of raised extensions or projections or formations, which may be identical or differently configured to define an incomplete ring around the perimeter of the central section 30 of the bar pin 18.

Depending on the nature and configuration of the radially enlarged sections 46, they may be formed in any of a number of ways. According to one embodiment, a portion of the end of the central section 30 of the bar pin 18 is deformed to define a radially enlarged section 46. This deformation may be carried out in any of a number of ways, including both hot-working and cold-working procedures. According to an exemplary method, the radially enlarged sections 46 comprise crimps, which may be formed using a crimping tool 48 of the type illustrated in FIGS. 7-10. The crimping tool 48 is provided with a curl die center housing 50 (which may be generally tubular) and top and bottom or first and second plates 52 and 54, which are associated with opposite ends of the center housing 50 and may be generally annular.

The center housing 50 is sized and configured to receive the partially assembled bushing assembly 10, with the inner diameter of the center housing 50 being approximately equal to the outer diameter of the outer sleeve 12, as shown in FIG. 7A. Each end of the center housing 50 may include an associated annular groove or counter-bore or recess 56 that is configured to receive a portion of the plate 52, 54 associated with that end, as in FIG. 7A. Preferably, the annular grooves 56 are configured such that the molded bushing 26 is fully positioned therebetween, with a small portion of the ends of the central section 30 of the bar pin 18 projecting into the annular grooves 56 (FIG. 7A).

The plates 52 and 54 may be substantially identical, with each being generally annular and having an inner diameter that is larger than (preferably only nominally larger than) the outer diameter of the end portions 40 of the bar pin 18, but smaller than the outer diameter of the central section 30, as shown in FIG. 7A. One end of each plate 52, 54 has a contoured or chamfered inner diameter or surface 58, which is best shown in FIG. 7B. The illustrated contoured inner diameter 58 approximates a 90° arc in profile, which extends between the associated end of the plate 52, 54 and a central bore 60 extending through the plate 52, 54. In other embodiments, the contoured inner diameter 58 may be differently configured without departing from the scope of the present disclosure.

Figure 9:
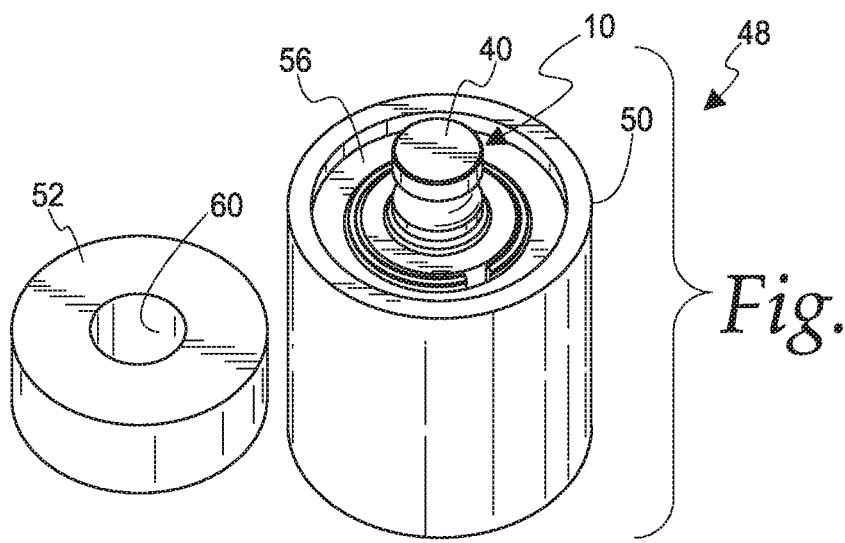
FIG. 9 is a perspective view of a vehicle suspension bushing assembly partially positioned within the crimping tool of FIGS. 7 and 7A.
Figure 10:
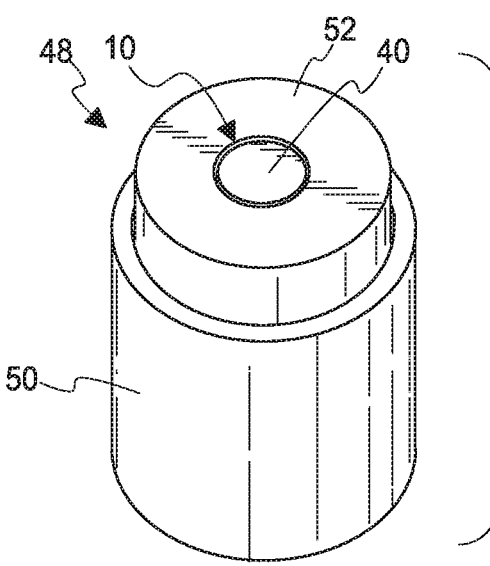
FIG. 10 is a perspective view of a vehicle suspension bushing assembly fully positioned within the crimping tool of FIGS. 7 and 7A.

In use, one of the plates 52, 54 (illustrated in FIG. 8 as the bottom plate 54) is placed into the associated annular groove 56 of the curl die center housing 50, with the contoured inner diameter 58 of the plate 52, 54 facing the center housing 50. The partially assembled bushing assembly 10 then may be placed into the center housing 50, as shown in FIG. 9, with one end portion 40 of the bar pin 18 being at least partially received by the plate 52, 54 associated with the center housing 50. The other plate 52, 54 is then placed into the associated annular groove 56 of the center housing 50 (illustrated in FIG. 10 as the top plate 52), so as to at least partially receive a second end portion 40 of the bar pin 18, with the contoured inner diameter 58 of the plate 52, 54 facing the curl die center housing 50, as seen in FIG. 7A.

One or both of the plates 52, 54 may be associated with a press (not illustrated) that forcibly advances the plates 52 and 54 toward each other. The press may be variously configured (e.g., as a hydraulic press), without departing from the scope of the present disclosure. By operating the press with the partially assembled bushing assembly 10 positioned as in FIGS. 7A and 10, the contoured inner diameters 58 of the plates 52 and 54 press against portions of the central section 30 of the bar pin 18 that extend into the spaces defined by the annular grooves 56 of the center housing 50 (as described above). The contoured inner diameters 58 press against and deform the ends of the central section 30 of the bar pin 18 from their initial shape 62 (shown in broken lines in FIG. 7B) to form the radially enlarged sections 46 (shown in solid lines in FIG. 7B).

In one embodiment, the components of the crimping tool 48 are pressed together by the press until they bottom out, with the first and second plates 52 and 54 fully advanced into the associated annular grooves 56. Preferably, this coincides with the plates 52 and 54 moving the radially enlarged sections 46 into contact with the outer ends of the associated retaining rings 20. If the retaining rings 20 are provided with chamfers 42 at the inner perimeter of their outer ends, as in the illustrated embodiment, then the displaced material of the central section 30 may move into contact with the chamfers 42 (FIG. 7B). The fully assembled bushing assembly 10 then may be removed from the crimping tool 48, with the radially enlarged sections 46 helping to maintain the installed position of the retaining rings 20.

In addition to deforming the end of the central section 30 of the bar pin 18, it is also within the scope of the present disclosure for the radially enlarged sections 46 to be formed by adding material to the end of the central section 30. For example, the radially enlarged sections 46 may comprise welds applied to the central section 30 or a snap ring secured proximate an end of the central section 30. Each of the radially enlarged sections 46 may be formed using the same approach (e.g., forming them all as crimps) or different approaches (e.g., forming one as a crimp and another as a weld), with the radially enlarged sections 46 all being formed simultaneously or with at least two of the radially enlarged sections 46 being formed sequentially.

Figure 11A:
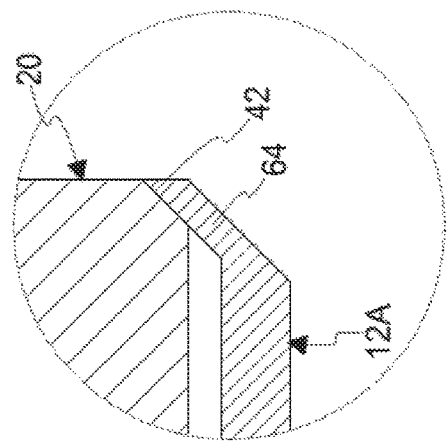
FIG. 11A is a detail view of a portion of the vehicle suspension bushing assembly of FIG. 11.
Figure 11B:
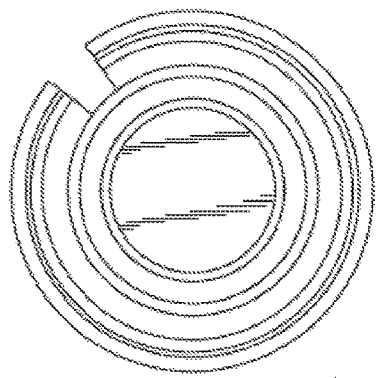
FIG. 11B is an end view of the vehicle bushing assembly of FIG. 11.
Figure 11:
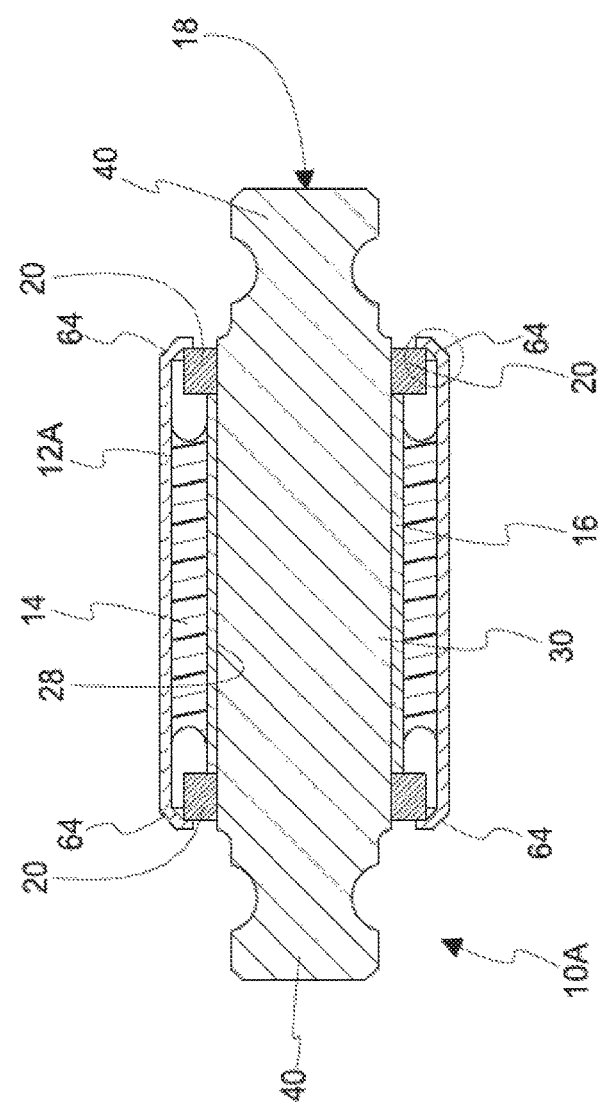
FIG. 11 is a cross-sectional view of an alternative embodiment of a vehicle suspension bushing assembly according to an aspect of the present disclosure.

Furthermore, rather than providing a radially enlarged section 46 associated with the central section 30 of the bar pin 18, it is also within the scope of the present disclosure for the outer sleeve 12 to include a radially inwardly directed section. For example, FIGS. 11, 11A and 11B show an alternative embodiment of a bushing assembly 10A with an elongated outer sleeve 12A having at least one end that extends axially outwardly of or beyond the associated retaining ring 20. All or a portion of the extending end may be bent or deformed radially inwardly to define a radially inwardly directed section 64, which blocks or resists movement of the associated retaining ring 20 out of the molded bushing 26. It is also within the scope of the present disclosure for a radially inwardly directed section 64 to be formed by adding material to the inner surface of the extending end of the outer sleeve 12A. For example, the radially inwardly directed section 64 may comprise one or more welds applied to the end or inner surface of the extending end of the outer sleeve 12A. If more than one radially inwardly directed section 64 is provided, then each may be formed using the same approach or different approaches, with the radially inwardly directed sections 64 all being formed simultaneously or with at least two being formed sequentially. It is also within the scope of the present disclosure for both radially enlarged sections 46 of the bar pin 18 and radially inwardly directed sections 64 of the outer sleeve 12A to be employed to help retain one or more retaining rings 20 in place.

FIGS. 12-14B illustrate embodiments of bushing assemblies 10B-10D employing a differently configured retaining ring 20A. The retaining ring 20A of FIGS. 12-14B is differently configured from the retaining ring 20 to the extent that it includes an outwardly extending flange 66. The retaining ring 20A may be mounted onto the central section 30 of the bar pin 18 with the flange 66 facing the associated end portion 40 of the bar pin 18, rather than abutting the inner sleeve 16. The outer diameter of the flange 66 may be greater than the inner diameter of the outer sleeve 12, such as an outer diameter that is greater than the inner diameter of the outer sleeve 12 and smaller than the outer diameter of the outer sleeve 12. By such a configuration, the surface of the flange 66 facing the outer sleeve 12 may bear against the outer sleeve 12 to properly position the retaining ring 20A on the bar pin 18. A retaining ring 20A having a flange 66 may be advantageous by providing additional axial strain control compared to an annular retaining ring 20.

In the embodiment of FIGS. 12-12B, the bushing assembly 10B is similarly configured to the bushing assembly 10 of FIG. 1, but with the annular retaining ring 20 replaced by the flanged retaining ring 20A. Additionally, rather than providing the bar pin 18 with a substantially cylindrical section 30 having a substantially uniform outer diameter, the central section 30A of the bar pin 18A of FIGS. 12-12B may have a stepped configuration. As used herein, the term "stepped configuration" refers to a central section 30A having a central-most portion 68 representing the maximum outer diameter of the bar pin 18A, with smaller diameter stepped-down portions 70 at each end of the central-most portion 68. The stepped-down portions 70 may have nominally smaller outer diameters than the outer diameter of the central-most portion 68, which is sufficient to define a rim or step 72 at the transition between the central-most portion 68 and each stepped-down portion 70. In mounting a retaining ring 20A onto the central section 30A of the bar pin 18A, the retaining ring 20A may be pressed toward the central-most portion 68 until it abuts the rim or step 72, thereby properly positioning the retaining ring 20A on the bar pin 18A. As in the embodiment of FIGS. 1-10, each retaining ring 20A may be held in place by a radially enlarged section 46 of any suitable configuration that may bear against a chamfer 42 of the retaining ring 20A (if provided). In one embodiment, the rim or step 72 is configured to contact the retaining ring 20A so as to prevent the retaining ring 20A from contacting the inner sleeve 16 and restricting or otherwise affecting torsional motion within the bushing assembly 10B.

In the embodiment of FIGS. 13-13B, the bushing assembly 10C combines the flanged retaining ring 20A with a bar pin 18 having a central section 30 with a uniform outer diameter, as in the embodiment of FIGS. 1-10. Rather than holding the retaining ring 20A in place on the bar pin 18 with a radially enlarged section or a radially inwardly directed section or a rim, the retaining ring 20A may be merely press-fit onto the central section 30 of the bar pin 18. The retaining rings 20A may be pressed onto the central section 30 of the bar pin 18 until each flange 66 contacts the outer sleeve 12, as shown in FIG. 13B, to properly position the retaining rings 20A for use. The retaining rings 20A are removable and may be allowed to slide away from the outer sleeve 12, as they are not confined in place by a radially enlarged section or a radially inwardly directed section. This allows the retaining rings 20A to move away from the outer sleeve 12 until they come into contact with another component of the vehicle suspension assembly (e.g., a shackle, frame hanger, or clevis-type chassis component). The retaining rings 20A will tend to slide away from the outer sleeve 12 with any series of moderate or higher axial loads when the outer sleeve 12 moves relative to the bar pin 18 (i.e., the outer sleeve 12 effectively pushes the retaining rings 20A outwardly). In their displaced positions, the retaining rings 20A allow for some axial motion within the bushing assembly 10C (which is intended and may be desirable), while still limiting the maximum axial strain or displacement in the bushing assembly 10C, thereby improving the durability of the bushing assembly 10C.

FIGS. 14-14B illustrate a variation of the bushing assembly 10C of FIGS. 13-13B. The bushing assembly 10D of FIGS. 14-14B differs from the bushing assembly 10C in that its bar pin 18B is tubular, rather than being of solid construction. It should be understood that the other bushing assemblies described herein may also incorporate a tubular bar pin 18B instead of a solid or cylindrical bar pin 18, 18A. A tubular bar pin 18B allows for a bushing assembly to be connected to different components of a vehicle suspension than a solid bar pin 18, 18A (e.g., for use in a rear spring position) or to be connected to similar vehicle suspension components in a different manner. In the case of a tubular bar pin 18B, the central section 30 may be less defined than the central section 30 of the bar pin 18 of FIGS. 1 and 2, but it may remain advantageous for the various components secured to the tubular bar pin 18B to be centered with respect to the ends of the tubular bar pin 18B (with the portion of the tubular bar pin 18B to which the elastomeric liner 28 or inner sleeve 16 is secured comprising the central section 30 of the tubular bar pin 18B, as shown in FIG. 14A).

FIGS. 15-15B illustrate a variation of the bushing assembly 10D of FIGS. 14-14B. The bushing assembly 10E of FIGS. 15-15B differs from the bushing assembly 10D by replacing the flanged retaining ring 20A with a ferrule 20B that is secured (e.g., by crimping or press fit) to the bar pin 18B. Each ferrule 20B may have an inwardly extending flange 74, which may be substantially annular and configured to overlay the associated end of the bar pin 18B (e.g., having the same inner diameter as the bar pin 18B), thereby simulating an end portion of the bar pin 18B. Compared to the bushing assembly 10D of FIGS. 14-14B, the tubular bar pin 18B may be relatively short, for example with a length that is shorter by an amount equal to twice the thickness of the inwardly extending flange 74 of each ferrule 20B. By such a configuration, the inwardly extending flanges 74 of the ferrules 20B overlay the ends of the bar pin 18B and combine with the shorter bar pin 18B to give the bushing assembly 10E the same total length as the bushing assembly 10D of FIGS. 14-14B.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A vehicle suspension bushing assembly comprising:
an outer sleeve comprising an axially extending slit;
an elastomeric element at least partially positioned within the outer sleeve;
an inner sleeve at least partially positioned within the elastomeric element and defining a plurality of openings or apertures;
a retaining ring at least partially positioned within the outer sleeve; and a bar pin at least partially positioned within the inner sleeve and the retaining ring and including a central section extending between first and second ends, wherein
 a first end of the outer sleeve comprises at least one radially inwardly directed section, and
 the retaining ring is directly mounted on the bar pin and positioned between the inner sleeve and the at least one radially inwardly directed section of the outer sleeve.

2. The vehicle suspension bushing assembly of claim 1, wherein the outer sleeve and the elastomeric element are generally tubular, the inner sleeve is substantially tubular, the retaining ring is substantially annular, and the bar pin is generally cylindrical.

3. The vehicle suspension bushing assembly of claim 1, wherein the outer sleeve and the elastomeric element are generally tubular, the inner sleeve is substantially tubular, the retaining ring is substantially annular, and the bar pin is substantially tubular.

4. The vehicle suspension bushing assembly of claim 1, wherein the outer sleeve, elastomeric element and inner sleeve are joined as a molded bushing.

5. The vehicle suspension bushing assembly of claim 1, further comprising an elastomeric liner positioned between the inner sleeve and the bar pin.

6. The vehicle suspension bushing assembly of claim 1, wherein
 the first end of the central section comprises at least one radially enlarged section of the bar pin,
 the retaining ring is positioned between the inner sleeve and the at least one radially enlarged section, and
 the at least one radially enlarged section comprises a crimp.

7. The vehicle suspension bushing assembly of claim 1, wherein the elastomeric element further comprises an axially extending slit.

8. The vehicle suspension bushing assembly of claim 1, wherein
 the first end of the central section comprises at least one radially enlarged section of the bar pin,
 the retaining ring is positioned between the inner sleeve and the at least one radially enlarged section,
 the retaining ring comprises an outer end including a chamfer, and
 the at least one radially enlarged section abuts the chamfer.

9. The vehicle suspension bushing assembly of claim 1, wherein the inner sleeve abuts an inner end of the retaining ring.

10. The vehicle suspension bushing assembly of claim 1, further comprising a second retaining ring, wherein
 the second end of the central section of the bar pin comprises at least one radially enlarged section and/or a second end of the outer sleeve comprises at least one radially inwardly directed section, and
 the second retaining ring is positioned between the elastomeric element and the at least one radially enlarged section of the second end of the bar pin or the at least one radially inwardly directed section of the second end of the outer sleeve.

11. The vehicle suspension bushing assembly of claim 10, wherein
 the first end of the central section comprises at least one radially enlarged section of the bar pin,
 the retaining ring is positioned between the inner sleeve and the at least one radially enlarged section of the first end of the central section of the bar pin,
 the central section of the bar pin defines first and second rims,
 the retaining ring is positioned between the first rim and the at least one radially enlarged section of the first end of the central section of the bar pin, and
 the second retaining ring is positioned between the second rim and the at least one radially enlarged section of the second end of the central section of the bar pin.

12. The vehicle suspension bushing assembly of claim 10, wherein
 each of the outer sleeve, the elastomeric element, the inner sleeve, and the retaining rings extends between opposing ends,
 the ends of the elastomeric element are concave and spaced inwardly of the ends of the outer sleeve and the ends of the inner sleeve,
 one of the ends of each retaining ring abuts an adjacent end of the inner sleeve, and
 the other one of the ends of each retaining ring abuts the radially inwardly directed section at the adjacent end of the outer sleeve.

13. A method of assembling a vehicle suspension bushing assembly, comprising:
 providing an outer sleeve comprising an axially extending slit and including an elastomeric element at least partially positioned therewithin and an inner sleeve defining a plurality of openings or apertures at least partially positioned within the elastomeric element;
 positioning at least a portion of a bar pin within the inner sleeve;
 positioning a retaining ring at or adjacent to a first end of a central section of the bar pin and at least partially within the outer sleeve; and
 defining at least one radially inwardly directed section of the outer sleeve, wherein the retaining ring is directly mounted on the bar pin and positioned between the inner sleeve and the at least one radially inwardly directed section of the outer sleeve.

14. The method of claim 13, further comprising at least partially closing the axially extending slit.

15. The method of claim 13, wherein the outer sleeve and the elastomeric element are generally tubular, the inner sleeve is substantially tubular, the retaining ring is substantially annular, and the bar pin is generally cylindrical.

16. The method of claim 13, wherein the outer sleeve and the elastomeric element are generally tubular, the inner sleeve is substantially tubular, the retaining ring is substantially annular, and the bar pin is substantially tubular.

17. The method of claim 13, further comprising at least partially closing a slit defined in the elastomeric element.

18. The method of claim 13, further comprising defining at least one radially enlarged section at the first end of the central section of the bar pin, wherein
 the retaining ring is positioned between the inner sleeve and the at least one radially enlarged section,
 the retaining ring comprises an outer end including a chamfer, and
 said defining at least one radially enlarged section includes causing the at least one radially enlarged section to abut the chamfer.

19. The method of claim 13, wherein said positioning a retaining ring includes positioning an inner end of the retaining ring to abut the inner sleeve.

20. The method of claim 13, further comprising positioning a second retaining ring at or adjacent to a second end of the central section of the bar pin and at least partially within the outer sleeve, and defining a second radially inwardly directed section of the outer sleeve, with the second retaining ring positioned between the inner sleeve at the second radially inwardly directed section of the outer sleeve, wherein each of the outer sleeve, the elastomeric element, the inner sleeve, and the retaining rings extends between opposing ends, the ends of the elastomeric element are concave and spaced inwardly of the ends of the outer sleeve and the ends of the inner sleeve, one of the ends of each retaining ring abuts an adjacent end of the inner sleeve, and the other one of the ends of each retaining ring abuts the adjacent radially inwardly directed section of the outer sleeve.

* * * * *